(12) United States Patent
Baret et al.

(10) Patent No.: US 9,578,446 B2
(45) Date of Patent: Feb. 21, 2017

(54) METHOD AS WELL AS SYSTEM FOR WIRELESS DATA TRANSMISSION

(75) Inventors: Marc Baret, Kembs (FR); Eric Birgel, Schopfheim (DE); Julien Fischer, Saint Louis (FR); Martine Lefebvre, Blotzheim (FR); Andrea Seger, Zell (DE); Mathieu Weibel, Greenwood, IN (US)

(73) Assignee: Endress + Hauser GmbH + Co. KG, Maulburg (DE)

( * ) Notice: Subject to any disclaimer, the term of this patent is extended or adjusted under 35 U.S.C. 154(b) by 78 days.

(21) Appl. No.: 14/241,490

(22) PCT Filed: Aug. 15, 2012

(86) PCT No.: PCT/EP2012/065959
§ 371 (c)(1),
(2), (4) Date: Jun. 30, 2014

(87) PCT Pub. No.: WO2013/029997
PCT Pub. Date: Mar. 7, 2013

(65) Prior Publication Data
US 2014/0308896 A1    Oct. 16, 2014

(30) Foreign Application Priority Data
Sep. 1, 2011    (DE) .................. 10 2011 082 002

(51) Int. Cl.
*H04W 4/00*     (2009.01)
*H04W 80/04*    (2009.01)
*H04W 92/18*    (2009.01)

(52) U.S. Cl.
CPC ............ *H04W 4/008* (2013.01); *H04W 4/006* (2013.01); *H04W 80/045* (2013.01); *H04W 92/18* (2013.01)

(58) Field of Classification Search
CPC ..................................... H04W 4/008
USPC ............................... 455/41.1, 41.2
See application file for complete search history.

(56) References Cited

U.S. PATENT DOCUMENTS

| | | | |
|---|---|---|---|
| 5,748,104 A | 5/1998 | Argyroudis et al. | |
| 7,463,149 B2 | 12/2008 | Friedrich et al. | |
| 7,502,316 B2 * | 3/2009 | Yoshimura et al. | 370/229 |
| 7,609,147 B2 | 10/2009 | Friedrich | |
| 7,640,007 B2 * | 12/2009 | Chen et al. | 455/414.1 |

(Continued)

FOREIGN PATENT DOCUMENTS

| | | |
|---|---|---|
| DE | 102004014563 B4 | 12/2005 |
| DE | 102004050383 A1 | 4/2006 |

(Continued)

OTHER PUBLICATIONS

Mar. 13, 2014 English Translation of IPR, WIPO, Geneva, Switzerland.

(Continued)

*Primary Examiner* — Tuan H Nguyen
(74) *Attorney, Agent, or Firm* — Bacon & Thomas, PLLC (57) ABSTRACT

A method for wireless data transmission between first and second transmission participants, wherein for wireless data transmission between the first and second participants alternately a first protocol and a second protocol are used, wherein the first protocol serves for unidirectional data transmission and the second protocol for bidirectional data transmission.

21 Claims, 4 Drawing Sheets

(56) References Cited

U.S. PATENT DOCUMENTS

2005/0185585 A1    8/2005   Yoshimura et al.

FOREIGN PATENT DOCUMENTS

| | | |
|---|---|---|
| DE | 102005058564 A1 | 7/2006 |
| DE | 102007062077 A1 | 7/2009 |
| EP | 0911775 A2 | 4/1999 |
| EP | 1128630 A2 | 8/2001 |
| EP | 1233576 A2 | 8/2002 |
| EP | 1647869 A2 | 4/2006 |
| EP | 1956513 A1 | 8/2008 |
| WO | 2008006416 A1 | 1/2008 |
| WO | 2008134991 A1 | 11/2008 |
| WO | 2013029997 A1 | 3/2013 |

OTHER PUBLICATIONS

May 2, 2012 German Search Report, German Patent Office, Munich, Germany.
Oct. 1, 2005 European Standard article, Norm DIN EN 13757-4:2005-10, Kommunikationssysteme fur Zahler und deren Fernablesung—Teil 4: Zahlerauslesung uber Funk (Fernablesung von Zahlern im SRD-Band von 868 Mhz bis 870 Mhz); Deutsche Fassung EN 13757-4:2005 (translates to: Standard DIN EN 13757-4:2005-10, communication systems for payers and remote reading of meters—Part 4: Pay readout by radio (remote reading of payers in the SRD band of 868 Mhz to 870 Mhz); German version EN 13757-4:2005).
Oct. 30, 2012 International Search Report, EPO, The Netherlands.

\* cited by examiner

METHOD AS WELL AS SYSTEM FOR WIRELESS DATA TRANSMISSION

TECHNICAL FIELD

The invention relates to a method for wireless data transmission between first and second transmission participants. Furthermore, the invention relates to a system comprising first and second participants, as well as to a field device of process automation technology and to a handheld servicing device for servicing such a field device.

BACKGROUND DISCUSSION

It is known from the state of the art to provide the housing of a sensor with an RFID (Radio Frequency Identification), data carrier, so that information stored in the RFID, data carrier can be retrieved contactlessly. Furthermore, it is known from German Patent DE 102008008072 A1 to connect this RFID, data carrier with an internal electronics unit of the sensor, so that signals from the RFID, data carrier can be provided internally to the sensor. For this purpose, the RFID, data carrier can be writable.

Furthermore, known from German Patent DE 202006012632 U1 is the application of RFID transponders for controlling machine access.

Various standards have been created for wireless data transmission. Thus, for example, an inductive coupling or near field coupling (NFC) can occur via magnetic fields. Data transmission and often also energy supply occurs, in such case, via a magnetic near field, which is provided by coils in a reading device and in a so-called tag. The frequencies used for such transmission lie at 135 kHz, 13.56 MHz and are set by the standards ISO 18000-2 and ISO 18000-3, respectively ISO 22536. Furthermore, it is known to use electromagnetic dipole fields for remote coupling. In such case, the data transmission, and often also the energy supply, occurs via antennas, for example, dipole antennas or spiral antennas.

The frequencies for this type of coupling occurs lie at 433 MHz, 868 MHz and 2.45 GHz, as set by the standards ISO 18000-7, ISO18000-6, respectively ISO 18000-4.

The conventional NFC communication method has, however, the disadvantage that it is too power intensive for continuous data transmission, such as occurs, for example, in the case of parametering of a field device of process and/or automation technology via a software tool for configuring the field device.

SUMMARY OF THE INVENTION

An object of the invention is, consequently, to enable an energy saving, wireless, data transmission for this purpose.

The object is achieved according to the invention by a method, by a system comprising first and second participants, as well as by a field device, respectively a corresponding handheld servicing device, suitable for performing the method.

As regards the method, the object is achieved by a method for wireless data transmission between first and second transmission participants, wherein for wireless data transmission between the first and second participants alternately a first protocol and a second protocol are used, wherein the first protocol serves for unidirectional data transmission and the second protocol for bidirectional data transmission.

For data transmission between the first participant and the second participant, there is thus used, alternately, a protocol serving, respectively suitable, for unidirectional data transmission and a protocol serving, respectively suitable, for bidirectional data transmission.

In a form of embodiment of the method, the first participant and the second participant respectively use corresponding interfaces for wireless data transmission, via which interfaces data are transmitted alternately according to the first and second protocols. Preferably, single interfaces are used by the first, respectively the second participants, in order to transmit data according to the first and second protocols.

In an additional form of embodiment of the method, the unidirectional data transmission by means of the first protocol occurs from the first participant to the second participant. During such a time span, data transmission is thus only possible from the first participant to the second participant. During this time span, the second participant can thus not transmit data to the first participant, but, instead, only receive data. However, the data transmission from the first to the second participant can be initiated and maintained by the second participant, for example, in that the second participant produces an induction field for retrieving data.

In an additional form of embodiment of the method, the bidirectional data transmission by means of the second protocol occurs between the first participant and the second participant. Data can thus during this time period be transmitted from the first to the second and from the second to the first participant. To this end, a second protocol different from the first protocol and serving for bidirectional data transmission can be used. In such case, thus, for example, data are transmitted alternately from the first to the second and from the second to the first participant.

In an additional form of embodiment of the method, the first participant is a field device of process automation technology for logging and/or determining process relevant data, such as, for example, one or more measured variables. Especially in the case of field devices in industrial plants, due to diverse ignition protection types that must be met on-site in the plant, there is often only a limited electrical power or electrical energy available. Such field devices are currently often still connected with a superordinated unit via an electrical current loop. Also, field devices are known, which are supplied with electrical energy from a battery integrated in or connected with the field device.

In an additional form of embodiment of the method, the second participant is a handheld servicing device, especially a smart phone, for servicing the field device. Provided in the handheld servicing device can be one or more programs for servicing one or more field devices. Such smartphones currently can use a number of protocols and/or interfaces, according to which they can, for example, communicate wirelessly according to the RFID, or NFC, standard.

In an additional form of embodiment of the method, the first protocol is a protocol for unidirectional data transmission according to the RFID standard.

In an additional form of embodiment of the method, the second protocol is a protocol for bidirectional data transmission according to the NFC standard.

The first and second protocols can utilize different frequency ranges. Thus, for example, the first protocol can act in a first frequency band, e.g. decimeter waves (UHF), in the range of 0.3 to 3 GHz, while the second protocol works in a second frequency band, e.g. 13.56 MHz. In this way, a greater range can be obtained by means of signals transmitted using the first protocol.

In an additional form of embodiment of the method, the interface for wireless data transmission is, in each case, an REID chipset with a corresponding antenna, wherein the first and second protocols are stored in the chipset and can be executed by the chipset.

In an additional form of embodiment of the method, during a first interval, the first protocol serves for transmission of data to the second participant, especially from a memory unit provided in the field device.

In an additional form of embodiment of the method, the memory unit is a persistent memory, for example, a FRAM or an EEPROM. Conventional REID transponders contain an EEPROM with fixed data, which can be read out by an REID or NFC reading device. This has the disadvantage that the data furnished there are static and, thus, cannot be changed. According to the present invention, an option is to integrate an REID transponder into the operating electronics of the first, respectively the second, participant, for example, a field device. Thus, the RFID transponder or a corresponding, antenna equipped interface suitable for wireless communication is located, for example, within the housing of a field device and is not, such as known from the state of the art, placed only on the outside of the housing.

In an additional form of embodiment of the method, the memory unit is connected with an operating electronics of the first participant, in the case of which such preferably involves a field device, wherein data can be stored in the memory unit by the operating electronics of the field device. Thus, the field device can, for example, write appropriately predetermined data into the memory unit, so that these data can be retrieved from this memory unit.

In an additional form of embodiment of the method, the memory unit is at least at times fed via the operating electronics of the field device. On the other hand, the memory unit can also be fed electrical and/or magnetic signals sent by means of the second participant, for example in the form of a service unit, such as a handheld servicing device. Furthermore, by means of these signals sent from the second participant to the first participant, also corresponding data can be written into the memory unit by the field device. Moreover, by means of the electrical and/or magnetic signals sent by the service unit, also the communication unit of the first participant (preferably in the form of a field device) can be fed.

In an additional form of embodiment of the method, the second protocol serves during a second interval for bidirectional data transmission, especially for ascertaining data, which should be exchanged from the first participant to the second participant by means of the first protocol. Via the proposed method, data can, during transmission runtime, i.e. when the second protocol is being used, be changed in the first participant or in second participants and, moreover, a communication enabled, for example, via an RFID transponder of the field device.

In an additional form of embodiment of the method, during a third interval, data are written into the memory unit by the operating electronics of the field device, wherein the third interval lies preferably between the first and the second intervals. Through the connecting of the memory unit, for example, in the form of a FRAM, to the internal electronics of the first participant, for example, an operating electronics of a field device, the data to be transmitted can be made available to the first participant. This can occur, for example, via an internal bus system, via which data are exchanged between the memory unit and an operating electronics. The bus system can be, for example, an SPI, i.e. Serial Peripheral Interface, bus. The memory unit can, in such case, for example, be supplied with electrical energy withdrawn from a fieldbus, via which preferably also the field device and the operating electronics of the field device are supplied with electrical energy. Typically, field devices are often connected to such a wired fieldbus, so that they can also transmit and received data via the fieldbus.

In an additional form of embodiment of the method, the data written into the memory unit and/or transmitted from the first participant to the second participant during the first and/or second interval is process data such as, for example, measured values of the field device, data concerning a diagnosis of the field device, i.e. diagnostic data, or data for predictive maintenance of the field device in question.

In an additional form of embodiment of the method, for establishing data transmission between the first and second participants, an electromagnetic induction field is established by the second participant, in which induction field the first participant is located, and wherein the interface for wireless data transmission from the first participant is fed during the first interval by the induction field of the second participant. Additionally to energy supply of the first participant, which occurs in the case of a field device, for example, via a fieldbus interface of the field device or via a battery unit provided therefor, a second electrical circuit is provided, which can be fed inductively and/or electromagnetically from the second participant, which is, for example, a handheld servicing device. This second electrical circuit forms together with the reading device, for example, a closed oscillatory circuit, via which data can be transmitted according to the transponder principle. The second electrical current, respectively oscillatory circuit, can also operate a communication processor, which serves for data transmission via the corresponding interface of the first participant. This communication processor can, however, also be used for data transmission via NFC communication via the interface, i.e. the communication interface of the first participant for wireless data transmission. For example, a protocol according to ISO/IEC 18092/ECMA-340 can be utilized, in order to transmit data via this first interface of the first participant. The communication processor can, however, also form in connection with the memory unit a semi passive RFID tag working according to the RFID standard.

In an additional form of embodiment of the method, the interface for wireless data transmission of the first participant is also fed during the second interval by the induction field of the second participant, and, through a load modulation of the first participant, data are transmitted from the first participant to the second participant.

It is thus an idea of the present invention to reduce energy required for data transmission by using a multiplex communication method, which switches sequentially, i.e., offset in time, between different transmission standards, respectively protocols.

In an additional form of embodiment of the method, the first and/or the second and/or the third interval lasts alternately a period of time, which is, in each case, predetermined, especially constant. The first, second and third intervals can also have different lengths.

In an additional form of embodiment of the method, the interface of the first participant includes an antenna, which is arranged especially in a viewing window pane of the field device or in a PG-connection of the field device.

As regards the system, the object is achieved by a system comprising first and second participants, wherein first and second protocols are provided, which are applied alternately, in order to transmit data wirelessly between the first and second participants, wherein the first protocol serves for unidirectional data transmission and the second protocol for bidirectional data transmission.

As regards the field device, the object is achieved by a field device of process automation technology for application in a system according to a proposed form of embodiment, respectively for performing the method according to one of the proposed forms of embodiment, wherein the field device functions as first participant. Preferably, the field device is a measuring device for automation technology. The measuring device can serve, for example, for registering one or more process variables, such as, for example, pressure, temperature, flow, pH-value, etc. Such measuring devices usually include a microcontroller, which, in turn, has various in- and outputs. These in- and outputs serve to transmit measured values of a process variable, to receive sensor data or to connect to a fieldbus system. Through the integration of, for example, the NFC/RFID technology, processes for identification and for cableless data transmission can be executed in energy saving manner. Especially, in the technologies already known in the field of automation technology, technologies such as Bluetooth or WLAN, these technologies require little electrical current, since the most energy, which is required for data transmission, comes from the reading device.

As regards the handheld servicing device, the object is achieved by a handheld servicing device for application in a system according to a proposed form of embodiment of the system, respectively by a handheld servicing device for performing the method according to one of the proposed forms of embodiment, wherein the handheld servicing device functions as second participant. The handheld servicing device can be the reading device referenced in the preceding paragraph. Suitable as handheld servicing device are, consequently, mobile end devices and reading devices, which enable the reading of RFID tags and/or an NFC communication or which are connectable to modules, which offers this functionality.

The proposed invention can, in such case, be used in different applications. During booting, i.e. start-up, of a field device, parameters such as, for example, the serial number, the physical device tag, PD tag for short, the device ID and/or the device revision number of the field device, respectively of its operating electronics, can be written, preferably from a memory belonging to the operating electronics, into the memory unit. A user can then from the memory unit, i.e. via the first interface connected with the memory unit, and by means of a corresponding program running in the service unit, also referred to as an "app", access an Internet port and supplementally retrieve information as regards the field device, in case the servicing device has an Internet connection. This additional information can concern, for example, order code details, production date, product status, replacement parts, technical information and/or documentation.

Another application of the proposed invention lies in following a manufacturing process. To this point in time, applied by field device manufacturers for following a manufacturing process of a field device are, for example, barcodes, in order to follow and/or to monitor the manufacturing process of a field device during the manufacturing. Instead of such a barcode system, a contactless manufacturing supervision system can be utilized according to one of the embodiments of the invention described above. To this end, the field devices can be equipped with corresponding RFID or NFC tags.

Another application lies in the field of parametering and diagnosis of field devices. In the proposed handheld servicing device, an executable program can be furnished, which retrieves data stored in the memory unit of the field device and utilizes such data, in order to perform a diagnosis of the field device. The data, which are stored in the memory unit of the field device, can have been, for example, previously fixed, so that always the requisite data is available for a diagnosis executed by means of the program running in the handheld servicing device. As soon as such a handheld servicing device comes into the vicinity, i.e. into the range, within which data transmission is possible, the handheld servicing device enters into an operating mode, in which it receives the data stored in the memory unit of the field device. In an alternative form of embodiment, also a complete parametering of the field device is an option for use of the described method.

BRIEF DESCRIPTION OF THE DRAWINGS

The invention will now be explained in greater detail based on the appended drawing, the figures of which show as follows:

FIGS. 3 a) and 3 b) are schematic representations of first and second forms of embodiment of a field device having an integrated antenna according to the proposed invention.

DETAILED DISCUSSION IN CONJUNCTION WITH THE DRAWINGS

Figure 1:
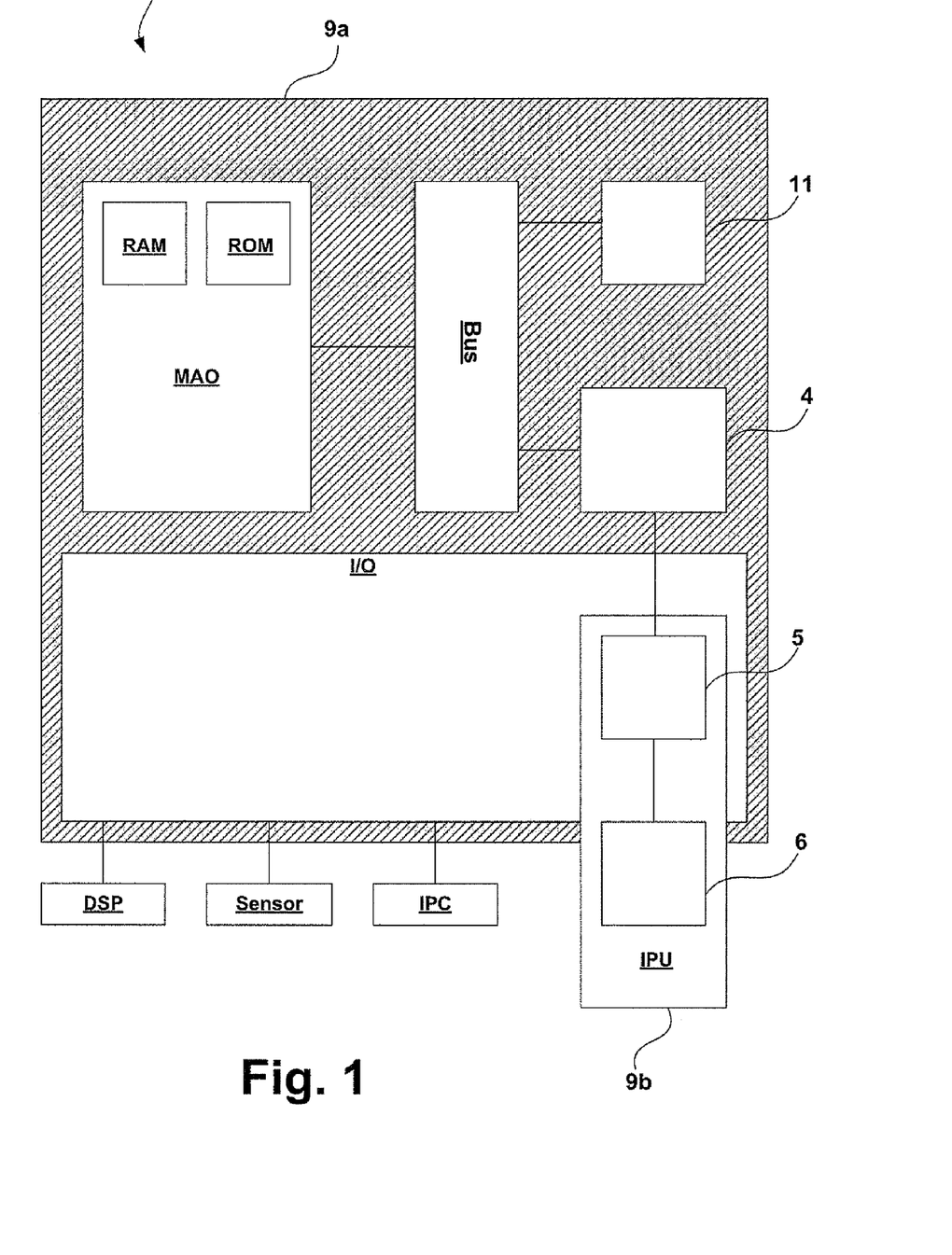
FIG. 1 is a schematic representation of a form of embodiment of a field device according to the proposed invention.

FIG. 1 shows a schematic representation of the construction of a field device 1 according to a form of embodiment of the proposed invention. Field device 1 is composed, in such case, essentially of a measurement transmitter, which has an operating electronics and an input/output unit I/O, which are connected with one another via a field device internal, bus system BUS. The input/output unit I/O is, in such case, connected, respectively connectable, with a display unit DSP and a measuring transducer, referred to in FIG. 1 as SENSOR. Further connected via the bus system BUS is an interface 9b, which serves for wireless communication, especially near field communication, with the operating electronics and the other bus participants. Field device 1, which is, for example, a 2 conductor, 4 conductor and/or battery operated, field device, has, furthermore, a first memory, for example, a RAM, an expanded RAM 11 and/or a ROM, which are connected via the device internal, bus system BUS. Moreover, a main processor MAO is provided, which provides the functions and functionalities of the field device 1 and interacts, for example, with RAM and/or ROM, such as indicated in FIG. 1. A preferably persistent memory 4, which is, for example, a FRAM, likewise connects via the device-internal bus system BUS and with the wireless communication interface 9b. Interface 9b includes an antenna 6 and preferably also a communication processor 5. Interface 9b can, for example, be operated as a transponder and fed by an induction field. Antenna 6 can be a so-called NFC antenna, an antenna, thus, which is suitable for near field communication according to the NFC standard.

The energy supply of the field device 1 can drive the operating electronics, which includes at least the main processor MAO, the bus system BUS, the first memory RAM or ROM and the second memory 4 and, in given cases, also the measuring transducer SENSOR and the display unit DSP. The interface 9b for wireless data transmission can be fed by an induction field. Involved, in such case, is thus a so-called passive interface 9b, which is not fed by the energy supply of the field device 1. Especially, the communication processor 5 of the interface 9b can be fed by the electrical energy absorbed via the antenna 6.

Figure 2:
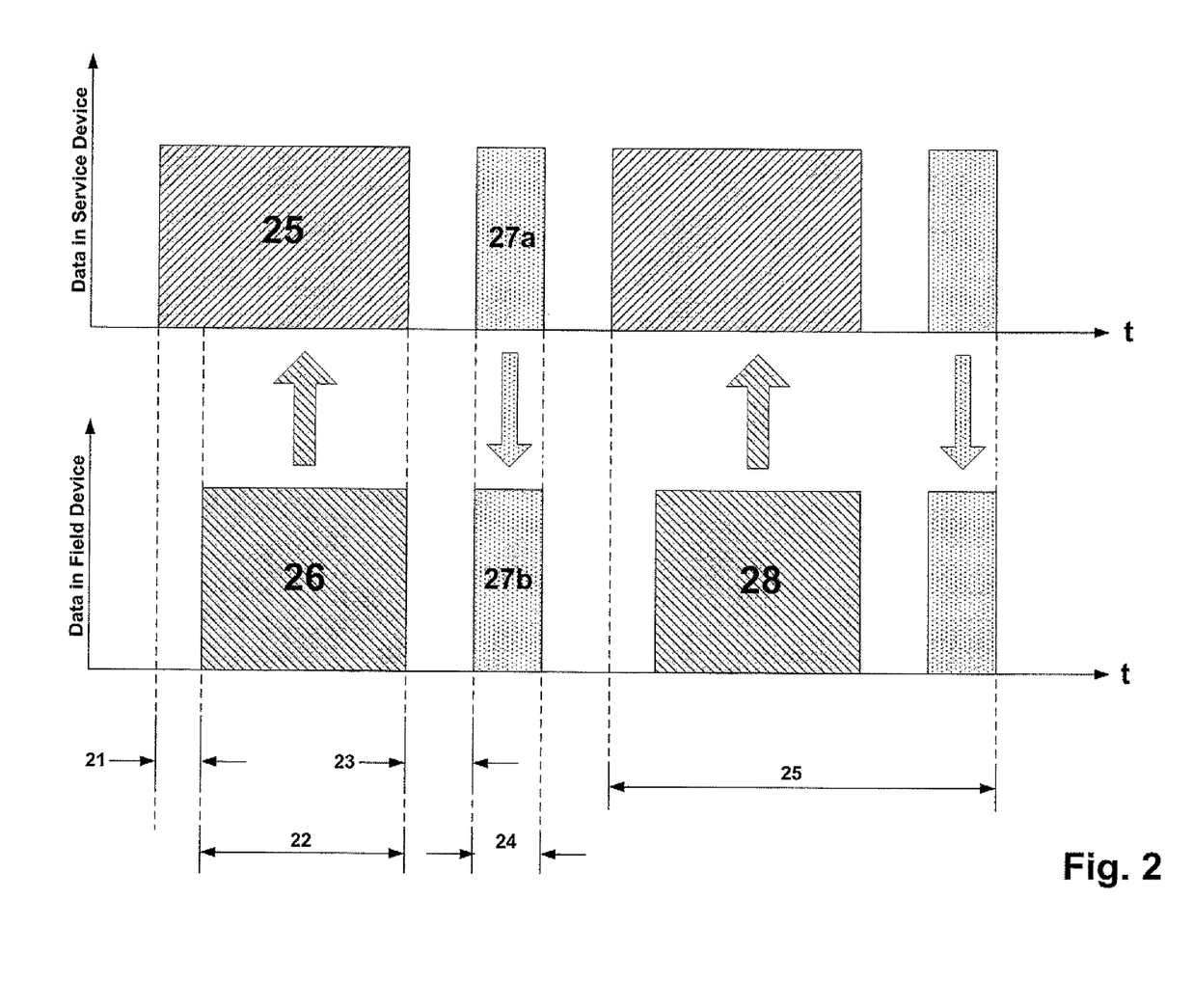
FIG. 2 is a schematic representation of a transpiring of a wireless data transmission between first and second participants according to the proposed invention.

FIG. 2 shows the course of a wireless data transmission between a first participant, for example, a field device 1, and a second participant, for example, a servicing device HH. The servicing device HH establishes during a period of time 21, for example, during a time when a field device 1 is in the vicinity of the service device HH, an electromagnetic induction field. As soon as the induction field has been established, during a period of time 22, data 26 are transmitted via the interface from the field device 1 to the servicing device HH. When new data is to be queried, the induction field is collapsed and the RFID transmission existing during the period of time 22 ended. After a period of time 23, both the field device 1 as well as also the servicing device HH, thus the first and second participants, establish an NFC connection, which serves for the bidirectional transmission of data. The data 27a, 27b transmitted during this time span 24 serve, for example, to determine the data 28, which are next stored in the second memory 4 and are to be transmitted during a thereon following time span, thus in the interval 26. The NFC connection is then interrupted and the servicing device HH obtains the data stored in the second memory 4 according to the first protocol, which was used already during the period of time 22 for unidirectional data transmission, i.e. according to, for example, the RFID protocol, respectively standard.

The proposed data exchange between the field device 1 and the servicing device HH can be used, for example, for retrieving field device information, for following the manufacturing process of the field device 1 and/or for parametering the field device 1.

Thus, for example, for retrieving field device information, especially upon the startup of the field device 1, parameters such as, for example, the serial number, the order number of the field device, the PD tag, the device ID and the device revision number, etc. of the field device 1 can be written into the second memory 4, which can be accessed from the interface 9b. This data can be read-out by the servicing device HH. If the servicing device HH has, for example, an Internet connection, then information, such as, for example, order code details, production data, product status, replacement parts, technical information and documentation concerning the field devices or the location of use of the field device 1 can be downloaded from a server.

In following a manufacturing process, it is known from the state of the art to use barcodes for identification, in order to follow the manufacturing process. Instead of the barcodes, it is, however, also an option to use a provided, preferably passive, interface 9b, thus an interface with transponder properties, such as, for example, an RFID tag or an NFC tag.

In order to perform the aforementioned method for information retrieval and for following a manufacturing process, only a unidirectional data transmission is required, provided that the tags used therefor already have the information required for identifying the field device. For parametering and for diagnosis of a field device, however, a dynamic querying of data via the interface, respectively the tag, is required. The selection of the thereto required data can, for example, be set in the field device 1. In this way, always new diagnostic data can be written into the memory 4, which can then be read-out by the servicing device HH.

Figure 3A:
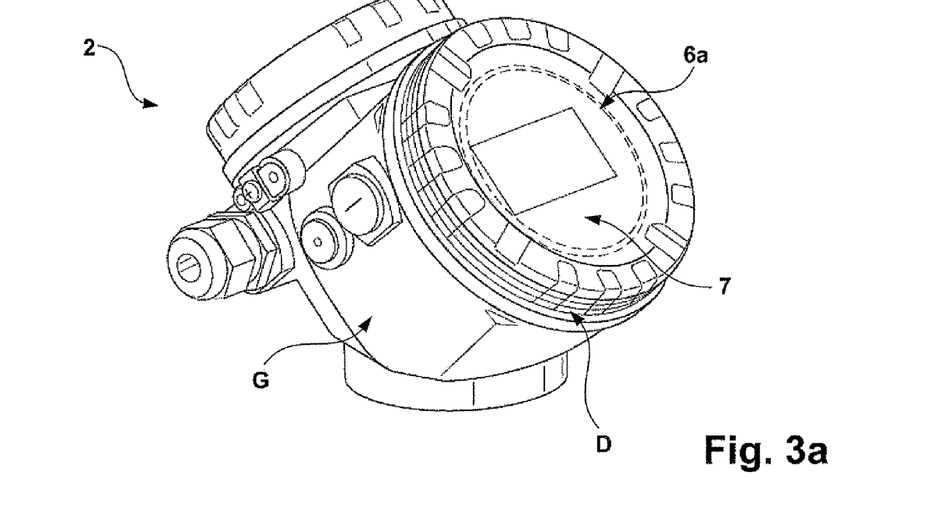
Figure 3B:
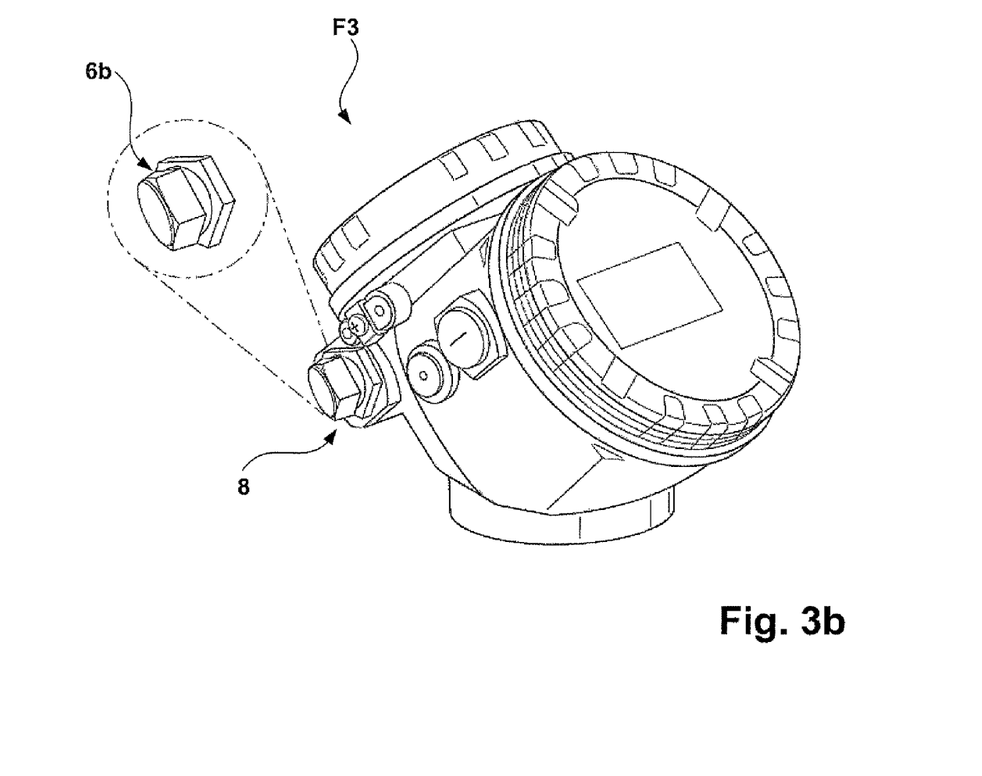

FIGS. 3 *a*), and 3 *b*), show schematic representations of first and second field devices 2, 3 according to the proposed invention, wherein an antenna 6a is placed in the viewing window pane 7 of a field device 2, 3 and/or an antenna 6b is placed in a so-called PG-connection 8, where PG refers to PG screw thread. Thus, it is possible to integrate a wireless, NFC and/or RFID antenna 6, 6a, 6b in or directly behind the viewing window pane 7 or lid glass of the field device 2. Thus, the shielding of a metal housing, which a large number of field devices 1 have, is avoided. Therefore, the design, i.e. the construction, of the existing housing H does not need to be changed. Only the lid L of the housing H is replaced. Thus, one can have field device variants with and without antenna 6, 6a, 6b for a wireless interface 9b for data transmission, wherein the same housing H is used.

The other opportunity of integrating an antenna 6b involves a so-called PG-connection 8 on the housing H of the field device 3, where an antenna 6b is connected instead of the cable, which is usually there.

Figure 4:
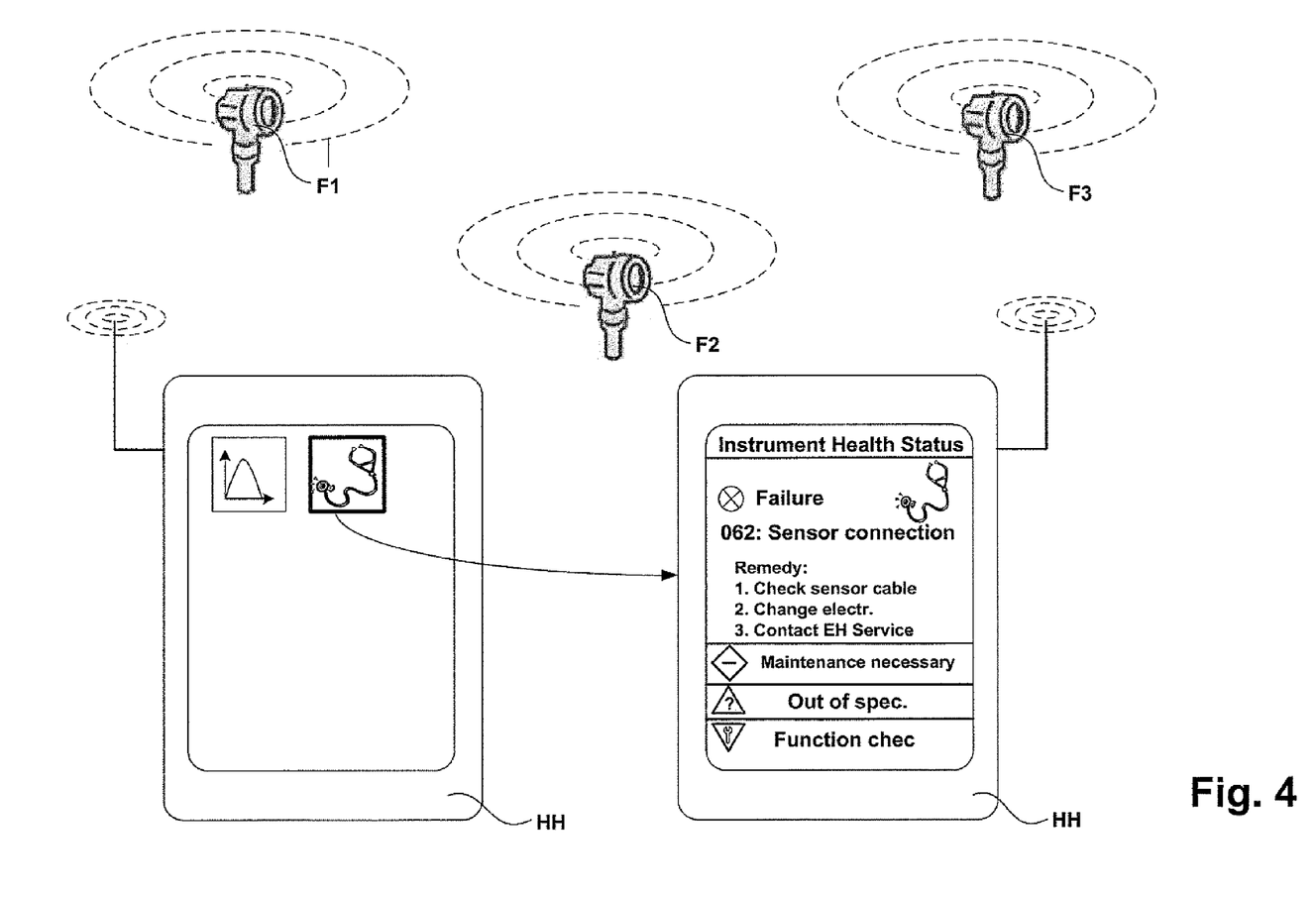
FIG. 4 is a schematic representation of a form of embodiment of the proposed invention for diagnosis of a field device on-site in a plant of automation technology.

FIG. 4 shows a schematic representation of an arrangement in a plant of automation technology, where typically a number of field devices are present. By means of the handheld servicing device HH, for example, field device specific data stored downloadably in second memory 4, can be downloaded from one or more of the field devices. By means of an appropriate application running on the handheld servicing device, then the data downloaded from the field device can be evaluated. In given cases, then additional information can be obtained by the handheld servicing device, for example, via the Internet. In FIG. 4, the handheld servicing device HH provides an envelope curve function and a diagnostic function. Following invoking the diagnostic function, different options are available to the user for continuing the diagnosis, especially in the case of malfunction. Especially, based on the data downloaded from the field device, a procedure for remedying the malfunction can be given. Alternatively, another data transmission can occur, in the case of which additional malfunction information or, in general, field device information can be downloaded from the field device. Especially, in the case where a device stops working, such as, for example, in the case of an interruption of the primary voltage supply of the field device, then still at least the data stored in the memory 4 can be downloaded, which can be, for example, the configuration of the field device present before the failure of the field device.

The invention claimed is:

1. A method for wireless data transmission between first and second transmission participants comprising the steps of:
   alternately a first protocol and a second protocol are used for wireless data transmission between the first and second participants, wherein:
   the first protocol serves for unidirectional data transmission and the second protocol for bidirectional data transmission
   the first participant is a field device of process automation technology for logging and determining process relevant data;
   the first protocol serves for the transmission of data from a memory unit provided in the field device to the second participant in a first interval, the memory unit is connected with an operating electronics of field device;

the second protocol serves during a second interval for bidirectional data transmission for ascertaining data, which is to be exchanged from the field device to the second participant by the means of the first protocol, and during a third interval, the data are written from the operating electronics of the field device into the memory unit.

2. The method as claimed in claim 1, wherein:
the first participant and the second participant respectively use corresponding interfaces for wireless data transmission, via which interfaces data are transmitted alternately according to the first and second protocols.

3. The method as claimed in claim 1, wherein:
the unidirectional data transmission by means of the first protocol occurs from the first participant to the second participant.

4. The method as claimed in claim 1, wherein: the bidirectional data transmission by means of the second protocol occurs between the first participant and the second participant.

5. The method as claimed in claim 1, wherein:
the second participant is a handheld servicing device, especially a smart phone, for servicing the field device.

6. The method as claimed in claim 1, wherein:
the first protocol is a protocol for unidirectional data transmission according to the RFID standard.

7. The method as claimed in claim 1, wherein:
the second protocol is a protocol for bidirectional data transmission according to the NFC standard.

8. The method as claimed in claim 1, wherein:
the interface for wireless data transmission is, in each case, an RFID chipset with a corresponding antenna; and
the first and second protocols are stored in the chipset and can be executed by the chipset.

9. The method as claimed in claim 1, wherein:
the memory unit is a persistent memory.

10. The method as claimed in claim 1, wherein:
the memory unit is connected with an operating electronics of the first participant, in the case of which such preferably involves a field device; and
data can be stored in the memory unit by the operating electronics of the field device.

11. The method as claimed in claim 1, wherein:
the memory unit is at least at times fed via the operating electronics of the field device.

12. The method as claimed in claim 1, wherein:
the data written into the memory unit and/or transmitted from the first participant to the second participant during the first and/or the second interval is process data for predictive maintenance of the field device.

13. The method as claimed in claim 1, wherein:
for establishing data transmission between the first and second participants, an electromagnetic induction field is established by the second participant, in which induction field the first participant is located; and
the interface for wireless data transmission from the first participant is fed during the first interval by the induction field of the second participant.

14. The method as claimed in claim 13, wherein:
the interface for wireless data transmission of the first participant is also fed during the second interval by the induction field of the second participant; and,
through a load modulation of the first participant, data are transmitted from the first participant to the second participant.

15. The method as claimed in claim 1, wherein:
the first and/or the second and/or the third interval lasts alternately a period of time, which is, in each case, predetermined, especially constant.

16. The method as claimed in claim 1, wherein:
the interface of the first participant includes an antenna, which is arranged especially in a viewing window pane of the field device or in a PG-connection of the field device.

17. The method as claimed in claim 1, wherein:
said persistent memory is a FRAM or an EEPROM.

18. The method as claimed in claim 1, wherein:
said process data comprises measured values of the field device or data concerning a diagnosis of the field device.

19. A system comprising:
first and second participants; and
first and second protocols, which are applied alternately, in order to transmit data wirelessly between said first and second participants, wherein:
said first protocol serves for unidirectional data transmission and said second protocol for bidirectional data transmission,
the first participant is a field device of process automation technology for logging and determining process relevant data,
the first protocol serves for the transmission of data from a memory unit provided in the field device to the second participant in a first interval,
the memory unit is connected with an operating electronics of the field device,
the second protocol serves during a second interval for bidirectional data transmission for ascertaining data, which is to be exchanged from the field device to the second participant by the means of the first protocol, and
during a third interval, the data are written from the operating electronics of the field device into the memory unit.

20. A field device of process automation technology for application in a system comprising: first and second participants;
and first and second protocols, which are applied alternately, in order to transmit data wirelessly between said first and second participants, wherein:
said first protocol serves for unidirectional data transmission;
said second protocol for bidirectional data transmission; and
for performing a method comprising the steps of:
alternately a first protocol and a second protocol are used for wireless data transmission between the first and second participants, wherein:
the first protocol serves for unidirectional data transmission and the second protocol for bidirectional data transmission, wherein the field device functions as a first participant,
the first protocol serves for the transmission of data from a memory unit provided in the field device to the second participant in a first interval,
the memory unit is connected with an operating electronics of the field device,
the second protocol serves during a second interval for bidirectional data transmission for ascertaining data, which is to be exchanged from the field device to the second participant by the means of the first protocol, and during a third interval, the data are written from the operating electronics of the field device into the memory unit.

21. A handheld servicing device for application in a system, comprising: first and second participants; and first and second protocols, which are applied alternately, in order to transmit data wirelessly between said first and second participants, wherein:

said first protocol serves for unidirectional data transmission and said second protocol for bidirectional data transmission; and for performing a method comprising: alternately a first protocol and a second protocol are used for wireless data transmission between the first and second participants, wherein:

the first protocol serves for unidirectional data transmission and the second protocol for bidirectional data transmission, wherein the handheld servicing device functions as second participant, the first participant is a field device of process automation technology for logging and determining process relevant data, the first protocol serves for the transmission of data from a memory unit provided in the field device to the second participant in a first interval, the memory unit is connected with an operating electronics of the field device, the second protocol serves during a second interval for bidirectional data transmission for ascertaining data, which is to be exchanged from the field device to the second participant by the means of the first protocol, and during a third interval, the data are written from the operating electronics of the field device into the memory unit.

\* \* \* \* \*